US011208544B2

(12) United States Patent
Castiglioni et al.

(10) Patent No.: US 11,208,544 B2
(45) Date of Patent: Dec. 28, 2021

(54) POLYMER COMPOSITION AND ITS USE AS A PHASE CHANGE MATERIAL

(71) Applicant: Versalis S.P.A., San Donato Milanese (IT)

(72) Inventors: Andrea Castiglioni, Mantova (IT); Francesco Scavello, Mantova (IT); Daniele Balducci, San Giorgio di Mantova (IT); Paolo Mariani, Milan (IT)

(73) Assignee: Versalis S.P.A., San Donato Milanese (IT)

( * ) Notice: Subject to any disclaimer, the term of this patent is extended or adjusted under 35 U.S.C. 154(b) by 47 days.

(21) Appl. No.: 16/332,863

(22) PCT Filed: Sep. 27, 2017

(86) PCT No.: PCT/IB2017/055879
§ 371 (c)(1),
(2) Date: Mar. 13, 2019

(87) PCT Pub. No.: WO2018/060867
PCT Pub. Date: Apr. 5, 2018

(65) Prior Publication Data
US 2019/0359803 A1 Nov. 28, 2019

(30) Foreign Application Priority Data

Sep. 28, 2016 (IT) .................. 102016000097191

(51) Int. Cl.
| *C08L 23/06* | (2006.01) |
| *C08L 27/12* | (2006.01) |
| *C08L 23/08* | (2006.01) |
| *C08F 210/16* | (2006.01) |
| *C08K 3/013* | (2018.01) |
| *C08K 3/34* | (2006.01) |
| *C08K 3/04* | (2006.01) |
| *C08K 3/26* | (2006.01) |
| *C08K 3/38* | (2006.01) |

(52) U.S. Cl.
CPC ............ *C08L 23/06* (2013.01); *C08F 210/16* (2013.01); *C08K 3/013* (2018.01); *C08K 3/042* (2017.05); *C08K 3/346* (2013.01); *C08L 23/08* (2013.01); *C08L 27/12* (2013.01); C08K 2003/265 (2013.01); C08K 2003/385 (2013.01); C08K 2201/001 (2013.01); C08K 2201/005 (2013.01); C08K 2201/016 (2013.01); C08L 2203/204 (2013.01); C08L 2205/06 (2013.01); C08L 2207/062 (2013.01); C08L 2207/064 (2013.01); C08L 2207/066 (2013.01); C08L 2310/00 (2013.01)

(58) Field of Classification Search
CPC ... C08K 3/34; C08K 3/04; C08L 23/08; C08F 210/16
USPC ......................................................... 524/404
See application file for complete search history.

(56) References Cited

U.S. PATENT DOCUMENTS

| 2003/0144370 A1* | 7/2003 | Stewart ................... C08L 23/04 |
| | | 521/79 |
| 2011/0024820 A1 | 2/2011 | Sakai et al. |
| 2012/0217434 A1* | 8/2012 | l'Abee ..................... C09K 5/14 |
| | | 252/74 |
| 2013/0172462 A1* | 7/2013 | Adesina .................. C08K 9/04 |
| | | 524/262 |
| 2015/0029941 A1 | 1/2015 | Dickinson et al. |

FOREIGN PATENT DOCUMENTS

| CN | 1196072 A | 10/1998 |
| CN | 1413229 A | 4/2003 |
| CN | 103384695 A | 11/2013 |
| CN | 104893672 A | 9/2015 |
| WO | WO 97/10294 A1 | 3/1997 |
| WO | WO 2006/023860 A2 | 3/2006 |

OTHER PUBLICATIONS

Richard J. Lewis, Sr., Hawley's Condensed Chemical Dictionary, Van Nostrand Reinhold, 13th Edition, p. 888 (Year: 1997).*
International Search Report and Written opinion for PCT/IB2017/055879 dated Jan. 11, 2018, 9 pages.
Gustafsson S. E. et al., "Journal of Physics D: Applied Physics" (1979), vol. 12, No. 9, p. 1411-1421.
Gustafsson S. E., "Journal of Applied Physics" (1982), vol. 53, No. 9, p. 6064-6068.
Office Action and Search Report issued for Chinese patent application 201780060061 9, dated Mar. 23, 2021. 9 pages. Translation in English is provided.

* cited by examiner

*Primary Examiner* — Deve V Hall
(74) *Attorney, Agent, or Firm* — Praedcere Law

(57) ABSTRACT

A polymer composition comprising: (a) from 50% by volume to 99% by volume, preferably from 70% by volume to 95% by volume, of at least one homopolymer or copolymer of ethylene; (b) from 1% by volume to 50% by volume, preferably from 5% by volume to 30% by volume, of at least two fillers having different thermal conductivity; (c) from 100 ppm to 4000 ppm, preferably from 200 ppm to 3500 ppm of at least one fluoropolymer; the sum of (a)+(b) being 100. Said polymer composition can be used as a phase change material (PCM), in particular for thermal energy storage (TES), more in particular for the storage of solar energy.

12 Claims, 1 Drawing Sheet

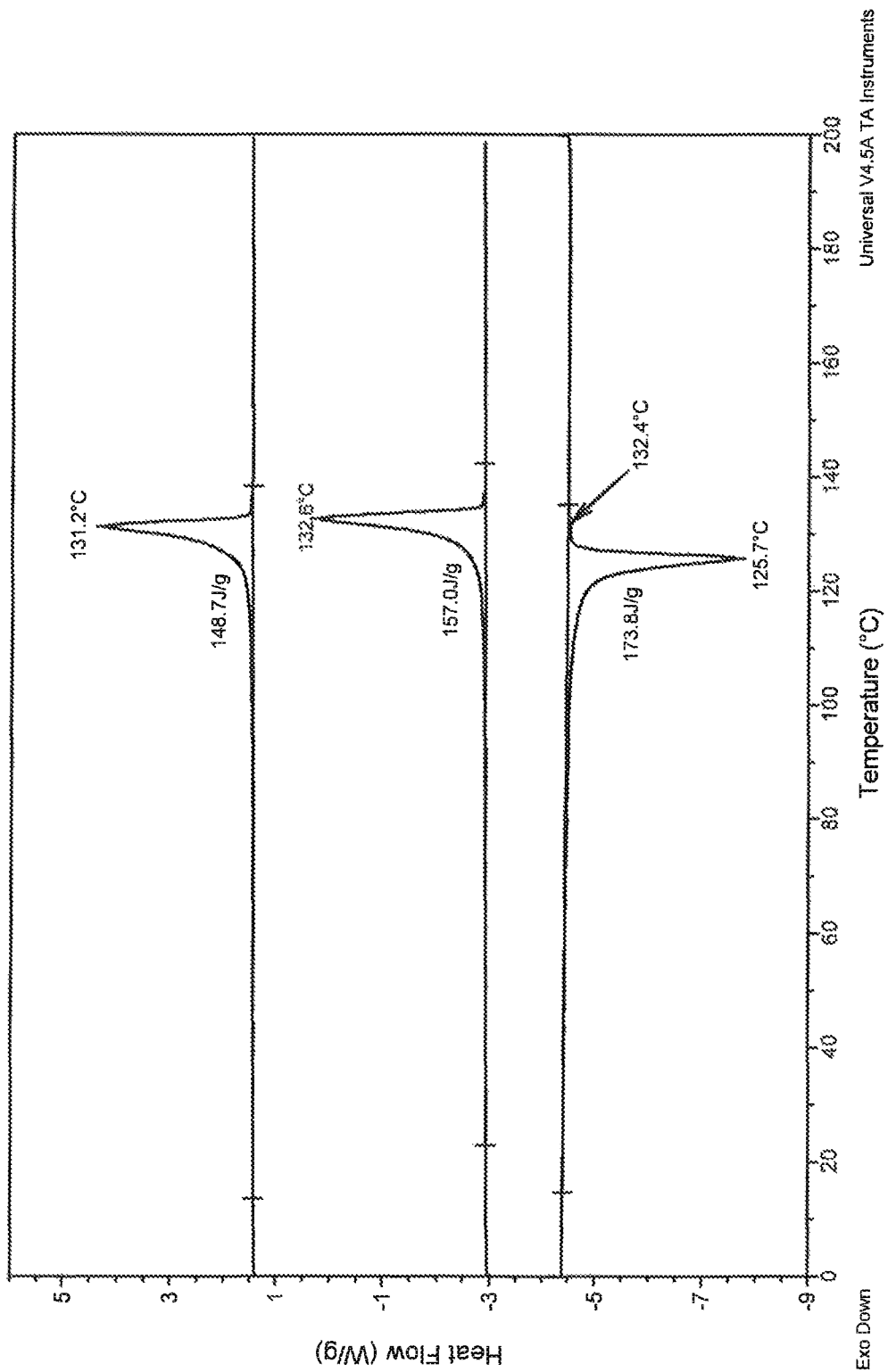

POLYMER COMPOSITION AND ITS USE AS A PHASE CHANGE MATERIAL

The present invention relates to a polymer composition and to its use as a phase change material (PCM).

More in particular, the present invention relates to a polymer composition comprising: (a) at least one homopolymer or copolymer of ethylene; (b) at least two fillers having different thermal conductivity; (c) at least one fluoropolymer.

Said polymer composition can be used as a phase change material (PCM), in particular for thermal energy storage (TES), more in particular for the storage of solar energy.

Consequently, the present invention also relates to the use of the aforementioned polymer composition as a phase change material (PCM).

Phase change materials (PCMs) are known in the prior art.

For example, international patent application WO 2006/023860 describes a thermally conductive composition comprising a mixture of a polymer matrix and spherical boron nitride agglomerates as a filler, wherein said spherical boron nitride agglomerates are formed by irregular non-spherical particles of boron nitride bound together by a binder and subsequently spray-dried, and having an aspect ratio of less than 2. The aforementioned thermally conductive composition can be used in applications in which thermal management is necessary, in different forms, including phase change materials (PCMs) in the form of: free-standing film or with a thermally conductive carrier, pad or thermally conductive sheet, thermally conductive grease or gel, thermally conductive adhesive or tape.

American patent application US 2011/0248208 describes a phase change material (PCM) comprising: (a) from 20% by weight to 80% by weight of a phase change material (PCM), preferably selected from alkyl hydrocarbons (paraffin waxes); (b) from 20% by weight to 80% by weight of one or more polymers selected from the group that consists of: (b1) very-low-density polyethylene (VLDPE) having a density lower than or equal to 0.910 g/cm$^3$ measured in accordance with standard ASTM 792; (b2) ethylene-propylene rubber (EPR) having a density lower than or equal to 0.900 g/cm$^3$ measured in accordance with standard ASTM 792; (b3) styrene-ethylene-butadiene-styrene (SEBS) copolymers; and (b4) styrene-butadiene-styrene (SBS) copolymers; the percentage by weight being based on the total weight of the composition. The aforementioned phase change material (PCM) is said to be usable in different applications in which thermal management is necessary. While the management of the temperature inside buildings is one of the most important applications, the aforementioned phase change material (PCM) can also be used in automotive applications (for example, in the ceiling, the seats and the tires of vehicles); or, it can be used: in air filters in air conduits; in transport; in food packaging (to keep food cool or warm); in drug packaging; in fabrics and non-woven fabrics for clothing and sportswear; in footwear; in hand grips (for example, in tools, sports items and vehicles); in bed linen; in carpets; in wood composite materials; in electrical cables; and in plastic pipes that transport hot substances including water.

American patent application US 2015/0299416 describes a phase change material (PCM) in the form of pellets that essentially consists of: a mixture of a paraffin, a polymer and optionally a thermal conductivity improver, a nucleating agent, an antioxidant, or mixtures thereof; wherein the paraffin is at least about 60% by weight of the phase change material (PCM) in the form of pellets; and the polymer is a high-density polyethylene (HDPE) having a melt flow index ranging from 0.1 g/10 minutes to 50 g/10 minutes. The aforementioned patent application also describes a process for preparing said phase change material (PCM) in the form of pellets. The aforementioned phase change material (PCM) in the form of pellets and the continuous pelletizing process described in the aforementioned patent application are said to be particularly suitable for the automation of processes for the preparation of phase change materials (PCMs). The phase change material (PCM) in the form of pellets produced with the low production cost pelletizing process can be used in different energy storage applications. Said applications include, for example, energy efficiency products to be used in the construction of buildings (for example, wallboards, under-roof insulation, tiles), in clothing, in footwear, in furniture.

Chinese patent application CN 104893672 describes a composite phase change material (PCM) comprising: high density polyethylene (HDPE), a paraffin and an inorganic filler. The aforementioned phase change material (PCM) is said to have good thermal conductivity, high thermal efficiency, good chemical stability, and a stable phase transition temperature. Said composite phase change material (PCM) can be used in different applications such as in interior ceilings, interior walls, heat recovery, and the like.

Since phase change materials (PCMs) can be used for different applications, their study is still of great interest.

The Applicant therefore set out to solve the problem of finding a new polymer composition that can be used as a phase change material (PCM).

The Applicant has now found a polymer composition comprising: (a) at least one homopolymer or copolymer of ethylene, (b) at least two fillers having different thermal conductivity, (c) at least one fluoropolymer, which can be advantageously used as a phase change material (PCM), in particular for thermal energy storage (TES), more in particular for the storage of solar energy. In fact, said polymer composition has excellent thermal properties such as, for example, high phase transition enthalpy and high thermal conductivity. Furthermore, said polymer composition has high chemical/physical stability upon aging and high thermal energy storage (TES) capacity. Furthermore, said polymer composition can be advantageously used for the storage of solar energy in the form of latent heat for its subsequent use. Furthermore, the presence of said fluoroelastomer does not have a negative influence either on the other thermal properties, in particular the Vicat softening temperature, or on the mechanical characteristics (for example, elastic modulus) of said polymer composition. Therefore, the object of the present invention is a polymer composition comprising:

(a) from 50% by volume to 99% by volume, preferably from 70% by volume to 95% by volume, of at least one homopolymer or copolymer of ethylene;
(b) from 1% by volume to 50% by volume, preferably from 5% by volume to 30% by volume, of at least two fillers having different thermal conductivity;
(c) from 100 ppm to 4000 ppm, preferably from 200 ppm to 3500 ppm of at least one fluoropolymer;
the sum of (a)+(b) being 100.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

In accordance with a preferred embodiment of the present invention, said homopolymer or copolymer of ethylene can be selected, for example, from:
- high-density polyethylene (HDPE);
- medium-density polyethylene (MDPE);
- low-density polyethylene (LDPE);
- linear-low-density polyethylene (LLDPE), very-low-density polyethylene (VLDPE), ultra-low-density polyethylene (ULDPE), which are copolymers of ethylene with at least one aliphatic α-olefin having the formula $CH_2=CH-R$ in which R represents a linear or branched alkyl group, preferably linear, containing from 1 to 12 carbon atoms, selected, for example, from: propylene, 1-butene, 1-pentene, 1-hexene, 1-octene, 1-decene;
- or mixtures thereof.

In accordance with a particularly preferred embodiment of the present invention, said homopolymer or copolymer of ethylene is high-density polyethylene (HDPE).

Examples of homopolymers or copolymers of ethylene that can be used in the present invention and that are currently available on the market are the products Eraclene®, Flexirene®, Riblene®, Clearflex®, by Versalis; MDPE HT 514 by Total Petrochemical; Engage® by DuPont-Dow Elastomers; Exact® by Exxon Chemical.

The homopolymers or copolymers of ethylene mentioned above can be obtained through polymerization techniques known in the state of the art, in presence of Ziegler-Natta catalysts, or in presence of chromium catalysts, or in presence of single-site catalysts, such as metallocene or hemimetallocene catalysts, or through radical processes.

In accordance with a preferred embodiment of the present invention, said (b) at least two fillers having different thermal conductivity can be selected, for example, from:
- ($b_1$) fillers having a thermal conductivity lower than or equal to 15 W/mK, preferably ranging from 1 W/mK to 10 W/mK;
- ($b_2$) fillers having a thermal conductivity higher than or equal to 50 W/mK, preferably ranging from 80 W/mK to 500 W/mK;

In accordance with a preferred embodiment of the present invention, said fillers ($b_1$) can be selected, for example, from: talc [$H_2Mg_3(SiO_3)_4$], calcium carbonate ($CaCO_3$), magnesium hydroxide [$Mg(OH)_2$], mica, barium oxide (BaO), boehmite [g-AlO(OH)], diaspore [g-AlO(OH)], gibbsite [$Al(OH)_3$], barium sulfate ($BaSO_4$), wollastonite ($CaSiO_3$), zirconium oxide ($ZrO_2$), silicon oxide ($SiO_2$), glass fiber, magnesium aluminate [$MgO_xAl_2O_3$ wherein x=from 1.5 to 2.5], dolomite [$CaMg(CO_3)_2$], clay, hydrotalcite, or mixtures thereof. Talc is preferred.

In accordance with a preferred embodiment of the present invention, said fillers ($b_2$) can be selected, for example, from: boron nitride (BN), aluminum nitride (AlN), magnesium silicon nitride ($MgSiN_2$), silicon carbide (SiC), graphite, ceramic coated graphite, expanded graphite, graphene, carbon fiber, carbon nanotubes (CNT), graphitized carbon black, or mixtures thereof. Boron nitride (BN) is preferred.

In accordance with a preferred embodiment of the present invention, said fillers ($b_1$) and said fillers ($b_2$) can have an aspect ratio, said aspect ratio being defined as the ratio between the diameter and the thickness of said fillers, ranging from 5 to 1000, preferably ranging from 10 to 500.

In accordance with a preferred embodiment of the present invention, said fillers ($b_1$) and said fillers ($b_2$) can have at least one of the three dimensions ranging from 0.1 μm to 1000 μm, preferably ranging from 3 μm to 500 μm.

In accordance with a preferred embodiment of the present invention, said polymer composition comprises at least one filler selected from ($b_1$) and at least one filler selected from ($b_2$) in a ratio by volume ranging from 4:1 to 1:2, preferably in a ratio by volume ranging from 2:1 to 1:1.

In accordance with a preferred embodiment of the present invention, said fluoropolymer (c) can be selected, for example, from fluoroelastomers, mixtures comprising a fluoroelastomer and a (co)polymer of ethylene, masterbatches comprising a fluoroelastomer and a (co)polymer of ethylene.

Examples of fluoropolymers that can be advantageously used for the purpose of the present invention are (co) polymers deriving from one or more of the following monomers: vinylidene fluoride, hexafluoropropylene, tetrafluoroethylene.

Examples of fluoropolymers that can be used in the present invention and that are currently available on the market are the products Viton® Freeflow™ GB, Viton® Freeflow™ Z100, Viton® Freeflow™ Z110, Viton® Freeflow™ Z200, Viton® Freeflow™ Z210, Viton® Freeflow™ Z300, Viton® Freeflow™ 10, Viton® Freeflow™ RC, by DuPont. The polymer composition according to the present invention can optionally comprise other additives commonly used in polymer compositions such as, for example: antioxidants such as, for example, sterically hindered phenols, phosphites, phosphonites; blowing agents; nucleating agents for blown systems; lubricants; UV stabilizers; dyes; metal deactivators; coupling agents. When present, said additives can be present in the polymer composition according to the present invention in quantities ranging from 0.01 parts by weight to 3 parts by weight, preferably ranging from 0.02 parts by weight to 1 part by weight, with respect to 100 parts by weight of (a) +(b).

The polymer composition according to the present invention can be prepared according to processes of the prior art.

For example, the polymer composition according to the present invention can be obtained by extrusion by feeding an extruder with:
(a) at least one homopolymer or copolymer of ethylene;
(b) at least two fillers having different thermal conductivity;
(c) at least one fluoropolymer;
and the other additives optionally present, described above, through independent dosers (for example, volumetric dosers), at the start of the extruder (i.e. at the machine mouth).

Said extruder can be selected, for example, from twin-screw extruders co-rotating or counter-rotating, or single-screw extruders. Preferably, said extrusion can be carried out at a temperature ranging from 150° C. to 230° C., at a pressure ranging from 10 bar to 50 bar and for an amount of time sufficient to obtain a uniform distribution of the compounds contained in the polymer composition in the polymer, generally for a time ranging from 0.5 minutes to 5 minutes, said time being understood as the residence time of the polymer composition in the extruder. At the end of said extrusion, the polymer composition obtained can be granulated and then formed and shaped through techniques known in the prior art (for example, compression molding).

Further object of the present invention is the use of said polymer composition as a phase change material (PCM), in particular for thermal energy storage (TES), more in particular for the storage of solar energy.

BRIEF DESCRIPTION OF THE DRAWINGS

Part of the granules obtained in EXAMPLE 3 below were subjected to DSC (Differential Scanning Calorimetry), for determining the phase transition enthalpy as shown in FIG. 1 in which Heat Flow (W/g) was determined as a function of Temperature (° C.).

For the purpose of understanding the present invention better and to put it into practice, below are some illustrative and non-limiting examples thereof.

EXAMPLE 1 (COMPARATIVE)

100% by volume of high-density polyethylene (HDPE) (Eraclene® MR 80 U by Versalis spa), were loaded into a co-rotating twin-screw extruder (D=30 mm; L/D=28) equipped with a die plate having cylindrical holes with a diameter of 3 mm, a length of 20 mm and flow rate per individual extrusion hole of 4.50 kg/h. The whole was extruded operating at a constant temperature profile of 200° C., at a constant pressure profile of 26 bar, at a flow rate of 4.50 kg/h per individual hole, and at a screw rotation speed of 100 rpm. The material extruded in "spaghetti" form was cooled in a water bath, dried in air, granulated using a chopper. Part of the granules obtained were compression molded at 240° C., 100 bar, for 5 minutes, obtaining a plaque with dimensions of 20×20×2 cm, which was subjected to thermal conductivity analysis: the datum obtained is reported in Table 1.

The thermal conductivity analysis was carried out operating according to the methodology described in: Gustafsson S. E. et al., "*Journal of Physics D: Applied Physics*" (1979), Vol. 12, No. 9, pg. 1411-1421 in relation to the equipment used; Gustafsson S. E., "*Journal of Applied Physics*" (1982), Vol. 53, No. 9, pg. 6064-6068 in relation to the thermal conductivity calculation.

Part of the granules obtained were compression molded at 200° C., 100 bar, for 5 minutes, obtaining a specimen with dimensions 15×40×4 mm which was subjected to Vicat softening temperature measurement operating in accordance with standard ISO 306:2004, Method A50 (1 kg–50° C./h), which was equal to 126° C.

EXAMPLE 2 (COMPARATIVE)

80% by volume of high-density polyethylene (HDPE) (Eraclene® MR 80 U by Versalis spa), 10% by volume of talc (aspect ratio=15; largest dimension: 35μm) (Imerys-FGRM) and 10% by volume of boron nitride (aspect ratio=30; largest dimension: 20 μm) (Boron Nitride Cooling Filler Platelets Grades 15/400), were loaded into a co-rotating twin-screw extruder (D=30 mm; L/D=28) equipped with a die plate having cylindrical holes with a diameter of 3 mm, a length of 20 mm and flow rate per individual extrusion hole of 1.50 kg/h. the whole was extruded operating at a constant temperature profile of 200° C., at a constant pressure profile of 26 bar, at a flow rate of 1.50 kg/h per individual hole, and at a screw rotation speed of 100 rpm. The material extruded in "spaghetti" form was cooled in a water bath, dried in air, granulated using a chopper. Part of the granules obtained were compression molded at 240° C., 100 bar, for 5 minutes, obtaining a plaque with dimensions of 20×20×2 cm, which was subjected to thermal conductivity analysis operating as described in Example 1: the datum obtained is reported in Table 1.

Part of the granules obtained were compression molded at 200° C., 100 bar, for 5 minutes, obtaining a specimen with dimensions 15×40×4 mm which was subjected to Vicat softening temperature measurement operating in accordance with standard ISO 306:2004, Method A50 (1 kg–50° C./h), which was equal to 126° C.

During extrusion the formation of die build up was observed on the die plate after about 3 hours of operation of the extruder. It is to be noted that the formation of die build up can cause the formation of irregularities on the surface of the extruded material which can lead to its breaking and to the consequent need to stop the extruder in order to clean the die plate.

EXAMPLE 3 (INVENTION)

80% by volume of high-density polyethylene (HDPE) (Eraclene® MR 80 U by Versalis spa), 10% by volume of talc (aspect ratio=15; largest dimension: 35 μm) (Imerys-FGRM) and 10% by volume of boron nitride (aspect ratio=30; largest dimension: 20 μm) (Boron Nitride Cooling Filler Platelets Grades 15/400) and 500 ppm of fluoropolymer (Viton® Freeflow™ GB by DuPont), were loaded into a co-rotating twin-screw extruder (D=30 mm; L/D=28) equipped with a die plate having cylindrical holes with a diameter of 3 mm, a length of 20 mm and flow rate per individual extrusion hole of 1.70 kg/h. The whole was extruded operating at a constant temperature profile of 200° C., at a constant pressure profile of 26 bar, at a flow rate of 1.70 kg/h per individual hole, and at a screw rotation speed of 100 rpm. The material extruded in "spaghetti" form was cooled in a water bath, dried in air, granulated using a chopper. Part of the granules obtained were compression molded at 240° C., 100 bar, for 5 minutes, obtaining a plaque with dimensions of 20×20×2 cm, which was subjected to thermal conductivity analysis operating as described in Example 1: the datum obtained is reported in Table 1.

Part of the granules obtained were compression molded at 200° C., 100 bar, for 5 minutes, obtaining a specimen with dimensions 15×40×4 mm which was subjected to Vicat softening temperature measurement operating in accordance with standard ISO 306:2004, Method A50 (1 kg–50° C./h), which was equal to 126° C.

During extrusion no formation of die build up was observed on the die plate even after 5 hours of operation of the extruder.

Part of the granules obtained were also subjected to DSC (Differential Scanning calorimetry), for the purpose of determining the phase transition enthalpy through a Perkin Elmer Pyris differential scanning calorimeter. For that purpose, 10 mg of granules were analyzed, with a scanning speed of 20° C./min in cooling and 5° C./min in heating, in an inert nitrogen atmosphere: the results obtained are reported in FIG. 1, from which it can be deduced that the polymer composition obtained as described above has a phase transition enthalpy of 151.6 J/g in fusion and 170.7 J/g in crystallization.

EXAMPLE 4 (INVENTION)

80% by volume of high-density polyethylene (HDPE) (Eraclene® MR 80 U by Versalis spa), 10% by volume of talc (aspect ratio=15; largest dimension: 35 μm) (Imerys-FGRM) and 10% by volume of boron nitride (aspect ratio=30; largest dimension: 20 μm) (Boron Nitride Cooling Filler Platelets Grades 15/400) and 3000 ppm of fluoropolymer (Viton® Freeflow™ GB by DuPont), were loaded into a co-rotating twin-screw extruder (D=30 mm; L/D=28) equipped with a die plate having cylindrical holes with a diameter of 3 mm, a length of 20 mm and flow rate per individual extrusion hole of 2.15 kg/h. The whole was extruded operating at a constant temperature profile of 200° C., at a constant pressure profile of 26 bar, at a flow rate of 2.15 kg/h per individual hole, and at a screw rotation speed of 100 rpm. The material extruded in "spaghetti" form was cooled in a water bath, dried in air, granulated using a chopper. Part of the granules obtained were compression molded at 240° C., 100 bar, for 5 minutes, obtaining a plaque with dimensions of 20×20×2 cm, which was subjected to thermal conductivity analysis operating as described in Example 1: the datum obtained is reported in Table 1.

Part of the granules obtained were compression molded at 200° C., 100 bar, for 5 minutes, obtaining a specimen with dimensions 15×40×4 mm which was subjected to Vicat softening temperature measurement operating in accordance with standard ISO 306:2004, Method A50 (1 kg–50° C./h), which was equal to 126° C.

During extrusion no formation of die build up was observed on the die plate even after about 5 hours of operation of the extruder.

TABLE 1

| EXAMPLE | THERMAL CONDUCTIVITY (W/mK) | FLOW RATE (kg/h) | Die build up time (h) |
| --- | --- | --- | --- |
| 1 (comparative) | 0.4 | 4.50 | — |
| 2 (comparative) | 2.4 | 1.50 | 3 |
| 3 (invention) | 2.4 | 1.70 | >5 |
| 4 (invention) | 2.4 | 2.15 | >5 |

From the data reported in Table 1 it can be deduced that the presence of fluoroelastomer [Example 3 (invention) and Example 4 (invention)] does not affect the thermal conductivity which remains unvaried with respect to Example 2 (comparative) which, however, shows a lower extrusion flow rate per individual hole (equal to 1.50 kg/h) with respect to the extrusion flow rate per individual hole of both Example 3 (invention) (equal to 1.70 kg/h), and Example 4 (invention) (equal to 2.15 kg/h). Furthermore, it can be deduced that the presence of fluoroelastomer [Example 3 (invention) and Example 4 (invention)] allows die build up to be prevented on the die plate even after 5 hours of operation of the extruder.

The invention claimed is:

1. A phase change material that is adapted for thermal energy storage, comprising a polymer composition comprising:
   (a) from 80% by volume to 99% by volume of at least one homopolymer or copolymer of ethylene;
   (b) from 1% by volume to 20% by volume of at least two fillers having different thermal conductivity: ($b_1$) fillers having a thermal conductivity lower than or equal to 15 W/mK; ($b_2$) fillers having a thermal conductivity higher than or equal to 50 W/mK;
   from 100 ppm to 4000 ppm of at least one fluoropolymer; wherein said at least one homopolymer or copolymer of ethylene and said at least one fluoropolymer, are the only (co)polymers of the composition, and the sum of (a)+(b) is 100.

2. A phase change material that is adapted for thermal energy storage, comprising a polymer composition according to claim 1, wherein said homopolymer or copolymer of ethylene is selected from:
   high-density polyethylene (HDPE);
   medium-density polyethylene (MDPE);
   low-density polyethylene (LDPE);
   linear-low-density polyethylene (LLDPE), very-low-density polyethylene (VLDPE), ultra-low-density polyethylene (ULDPE), which are copolymers of ethylene with at least one aliphatic α-olefin having the formula $CH_2=CH-R$ in which R represents a linear or branched alkyl group containing from 1 to 12 carbon atoms, selected from: propylene, 1-butene, 1-pentene, 1-hexene, 1-octene, 1-decene;
   or mixtures thereof.

3. A phase change material that is adapted for thermal energy storage, comprising a polymer composition according to claim 1, wherein said fillers ($b_1$) are selected from: talc $H_2Mg_3(SiO_3)_4$, calcium carbonate ($CaCO_3$), magnesium hydroxide [$Mg(OH)_2$], mica, barium oxide (BaO), boehmite [g-AlO(OH)], diaspore [g-AlO(OH)], gibbsite [$Al(OH)_3$], barium sulfate ($BaSO_4$), wollastonite ($CaSiO_3$), zirconium oxide ($ZrO_2$), silicon oxide ($SiO_2$), glass fiber, magnesium aluminate [$MgO_xAl_2O_3$ in which x=from 1.5 to 2.5], dolomite [$CaMg(CO_3)_2$], clay, hydrotalcite, or mixtures thereof.

4. A phase change material that is adapted for thermal energy storage, comprising a polymer composition according to claim 1, wherein said fillers ($b_2$) are selected from: boron nitride (BN), aluminum nitride (AlN), magnesium silicon nitride ($MgSiN_2$), silicon carbide (SiC), graphite, ceramic coated graphite, expanded graphite, graphene, carbon fiber, carbon nanotubes (CNT), graphitized carbon black, or mixtures thereof.

5. A phase change material that is adapted for thermal energy storage, comprising a polymer composition according to claim 1, wherein said fillers ($b_1$) and said fillers ($b_2$) have:
   an aspect ratio, said aspect ratio being defined as the ratio between the diameter and the thickness of said fillers, ranging from 5 to 1000; and/or
   at least one of the three dimensions ranging from 0.1 μm to 1000 μm.

6. Polymer composition according to claim 1, wherein said at least one filler ($b_1$) and said at least one filler ($b_2$) are present in a ratio by volume ranging from 4:1 to 1:2.

7. A phase change material that is adapted for thermal energy storage, comprising a polymer composition according to claim 1, wherein said fluoropolymer (c) is selected from fluoroelastomers, mixtures comprising a fluoroelastomer and an ethylene (co)polymer, masterbatches comprising a fluoroelastomer and a (co)polymer of ethylene.

8. A phase change material that is adapted for thermal energy storage, comprising a polymer composition according to claim 1 comprising from 200 ppm to 3500 ppm of said at least one fluoropolymer.

9. A phase change material that is adapted for thermal energy storage, comprising a polymer composition according to claim 1 wherein said fillers (b1) have a thermal conductivity ranging from 1 W/mK to 10 W/mK and said fillers ($b_2$) have a thermal conductivity ranging from 80 W/mK to 500 W/mK.

10. A phase change material that is adapted for thermal energy storage, comprising a polymer composition according to claim 5 wherein said fillers ($b_1$) and said fillers ($b_2$) have:
    said aspect ratio ranging from 10 to 500; and/or said at least one of the three dimensions ranging from 3 μm to 500 μm.

11. A phase change material that is adapted for thermal energy storage, comprising a polymer composition according to claim 1, wherein said at least one filler ($b_1$) and said at least one filler ($b_2$) are present in a ratio by volume ranging from 2:1 to 1:1.

12. A phase change material that is adapted for thermal energy storage, comprising a polymer composition according to claim 1 wherein said at least one fluoropolymer does not reduce a thermal conductivity of said polymer composition.

* * * * *